(12) United States Patent
Kitamura et al.

(10) Patent No.: US 6,438,646 B1
(45) Date of Patent: Aug. 20, 2002

(54) STORAGE SUBSYSTEM HAVING A PLURALITY OF INTERFACES CONFORMING TO A PLURALITY OF DATA FORMATS

(75) Inventors: Manabu Kitamura, Yokohama; Akira Yamamoto, Sagamihara; Shigeo Honma, Odawara, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/215,277

(22) Filed: Dec. 18, 1998

(30) Foreign Application Priority Data

Dec. 19, 1997 (JP) .............................. 9-350510

(51) Int. Cl.[7] .......................... G00F 12/10; G00F 12/04
(52) U.S. Cl. .................... 711/112; 711/147; 711/202
(58) Field of Search ................. 711/112, 113, 711/147, 202; 395/500.44, 500; 360/48

(56) References Cited

U.S. PATENT DOCUMENTS

| | | | | |
|---|---|---|---|---|
| 4,875,155 A | * | 10/1989 | Iskiyan et al. ............... | 711/113 |
| 5,388,013 A | * | 2/1995 | Nakamura .................... | 360/48 |
| 5,535,372 A | * | 7/1996 | Benhase et al. ........ | 395/500.44 |
| 5,568,628 A | * | 10/1996 | Satoh et al. ................. | 711/113 |
| 5,862,363 A | * | 1/1999 | Taroda et al. ................ | 395/500 |
| 5,983,317 A | * | 11/1999 | Kanda et al. ................ | 711/112 |
| 6,041,391 A | * | 3/2000 | Kanda et al. ................ | 711/112 |
| 6,115,797 A | * | 9/2000 | Kanda et al. ................ | 711/147 |

FOREIGN PATENT DOCUMENTS

| | | |
|---|---|---|
| EP | 785 500 | 7/1997 |
| EP | 811 905 | 12/1997 |

\* cited by examiner

*Primary Examiner*—Matthew Kim
*Assistant Examiner*—B. R. Peugh
(74) *Attorney, Agent, or Firm*—Mattingly, Stanger & Malur, P.C.

(57) ABSTRACT

A disk conforms to a fixed length format and a storage subsystem shapes a CKD format record from a host computer in a fixed length unit to store shaped data therein. A format conversion program reads a fixed length block from the disk and extracts the shaped CKD format data to obtain such information to access a file system as file management information to thereby access the file system. Moreover, in an operation to write data on the disk, the data which the storage subsystem has received from the host computer is shaped in the conversion program into a sequence of data in a format to be written on the disk and then the sequence of data is written in a fixed length format thereon. Resultantly, data can be shared between systems using mutually different data formats to store data in storages.

11 Claims, 6 Drawing Sheets

STORAGE SUBSYSTEM HAVING A PLURALITY OF INTERFACES CONFORMING TO A PLURALITY OF DATA FORMATS

This application is related to U.S. application Ser. No. 08/774,447 filed Dec. 30, 1996 and U.S. application Ser. No. 08/912,872 filed Aug. 19, 1997, now U.S. Pat. No. 6,115, 797, contents of which are incorporated herein by reference.

BACKGROUND OF THE INVENTION

The present invention relates to a storage subsystem in an information processing system, and in particular, to a storage subsystem including a plurality of interfaces conforming to a plurality of data formats.

Recently, there has been intensively achieved "downsizing" of computer systems in which jobs conventionally conducted by a mainframe are carried out by small-sized computers such as personal computers and workstations. In the mainframe, there has been accumulated a large amount of information through jobs conducted in the past. In this situation, it is desired that the information accumulated in the mainframe is accessed from small-sized computers. Heretofore, there has been known a technology in relation to file sharing or file conversion between different operating systems in which, for example, an operating system of a workstation accesses a file of a file system created by an operating system of a personal computer. For some of the personal computer file systems, information such as file formats and positions of file management information are generally opened. Therefore, the workstation operating system can interpret a file format of a personal computer in the workstation to access a file in a file system created by the personal computer operating system.

In the mainframe, a disk access is conventionally accomplished in the count-key-data (to be abbreviated as CKD herebelow) format; whereas, a fixed length data (to be abbreviated as FBA format herebelow) format is used for the disk access in the open system. Consequently, to share a file between the main and open systems, it is required to absorb the difference between the data formats. JP-A-9-258908 (corresponding to U.S. patent application Ser. No. 08/774, 447) describes a technology to absorb the data format discrepancy. That is, there is provided a storage having a function in which when the open system reads a record written in the CKD format in the storage, the data is presented as data in a fixed length format, namely, the data is shaped in a particular format. Additionally, on the open system side, there is disposed means to interpret the fixed length data thus shaped in the particular format to thereby obtain a data field therefrom. With this provision, it is possible for the open system to read a data set written in the storage by the mainframe.

SUMMARY OF THE INVENTION

Although JP-A-9-258908 (corresponding to U.S. patent application Ser. No. 08/774,447) describes a method for the open system to read a data set from the mainframe, no description has been given of a method of writing data in a file system of the mainframe. On the open system side, there exists neither a concept of the count field of the CKD data nor a concept for the cylinder and the head described therein. Therefore, for the open system side to write the CKD data, there is required means to create a count field on the open system side. Moreover, for the mainframe side to read a data set written on the open system side, it is necessary to update, for example, management system of the file system generated on the mainframe side.

It is therefore an object of the present invention to provide an interface conforming to the CKD format and an interface conforming to the FBA format in a disk device so that the open system writes data in the file system of the mainframe.

In order to achieve the object above, there is provided a computer system in accordance with the present invention. The computer system in accordance with the present invention includes a first computer, a second computer, and a storage subsystem having a plurality of interfaces to establish connections to the first and second computers. The first computer accesses the storage subsystem in accordance with a count-key-data format and the second computer accesses the storage subsystem in accordance with a fixed length block format. The second computer includes access means for accessing a record in the count-key-data format, which is written by the first computer in the storage subsystem, via an interface conforming to a fixed length block format, acquiring means for acquiring only user data from the record read by the accessing means, and interpreting and using means for interpreting and utilizing management information of a file system and the like written in a record generated in the storage subsystem by the first computer. In addition, the second computer includes writing means for converting write data into a record in the count-key-data format and writing the record in the storage subsystem via an interface conforming to a fixed length block format.

Furthermore, in the data writing operation, the writing means of the second computer refers to management information of a file produced by the first computer in the storage subsystem, interprets a data format of the file, and writes therein records conforming to a data format of the file. Furthermore, by rewriting the management information of the file at completion of the writing operation of the second computer, it is possible for the first computer to read the record written by the second computer.

Moreover, the storage subsystem of the computer system in accordance with the present invention has a one-to-one correspondence between an address specified by a cylinder number and a head number in the count-key-data format and an address specified by a logical block number in the fixed length block format. The writing means of the second computer handles requested data as a record in the count-key-data format, generates a count field of a record in the count-key-data format in accordance with an address of a write position to thereby obtain through conversion a record in the count-key-data format, and calculates a logical block number in a fixed length format in association with a cylinder number and a head number for a writing operation in the storage subsystem so as to access the storage subsystem in accordance with the logical block number.

Additionally, in accordance with the present invention, the storage subsystem of the computer system includes a storage to store data in the fixed length block format, and the first computer includes writing means which converts a record written by the first computer via the count-key-data interface in a file into a sequence of data in the fixed length block format in a predetermined format to thereby write the sequence of data in the storage. Moreover, the writing means of the second computer includes means similar to means of the storage subsystem to convert a record into a sequence of data in the fixed length block format such that the converted sequence of data in the fixed length block format is written in the storage subsystem via an interface conforming to the fixed length block format.

Furthermore, the writing means divides the record in the counter-key-data format into fixed-length blocks for the writing thereof. When last one of the divided records has a length less than the fixed length, a predetermined sequence of data is added thereto beginning at the end of data to resultantly obtain a fixed length block so as to write the block in the storage subsystem.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Figure 1:
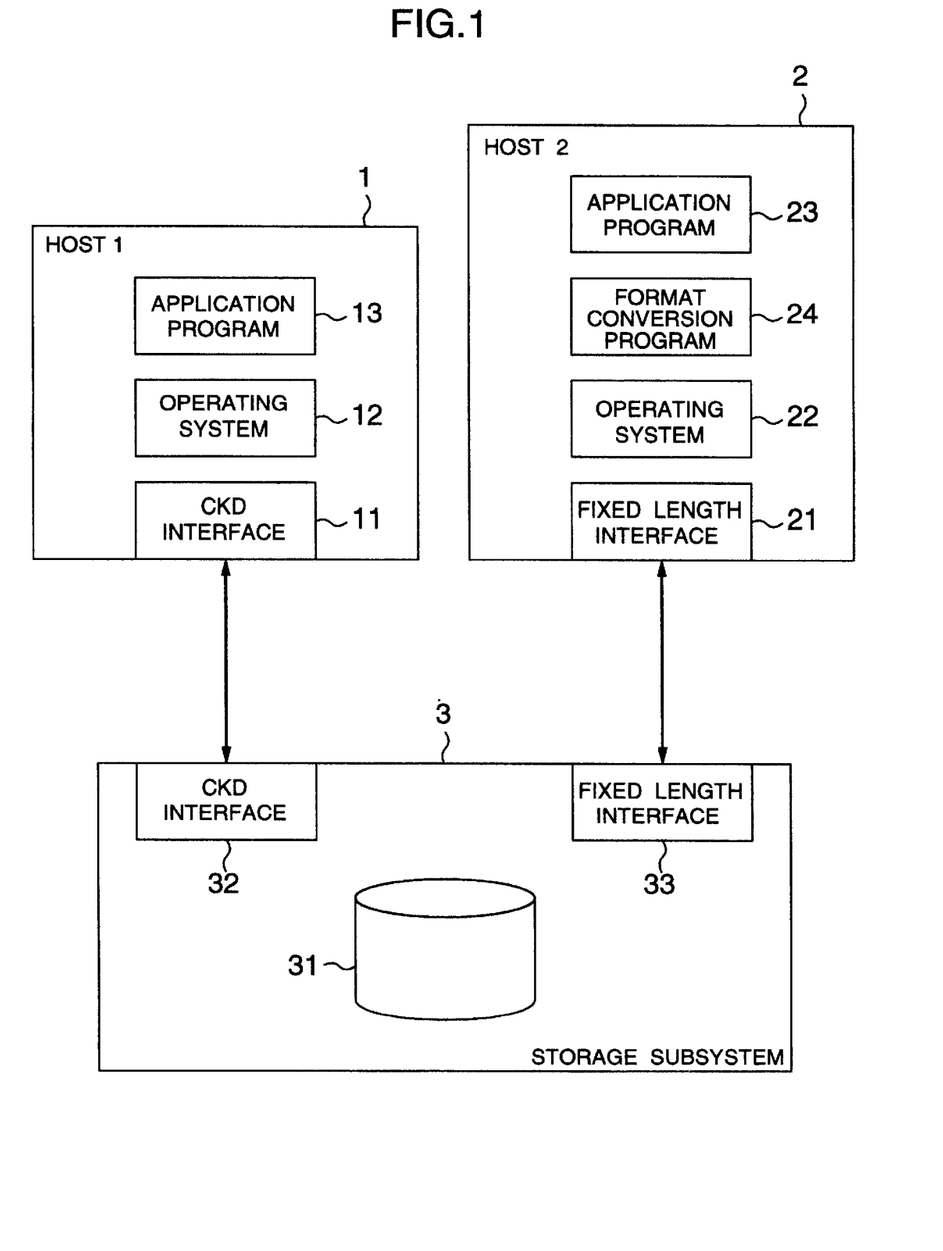
FIG. 1 is a configuration diagram showing constitution of a disk storage system in accordance with the present invention.

FIG. 1 shows a configuration example of a computer system in accordance with the present invention. The computer system includes a host computer 1, a host computer 2, and a storage subsystem 3 connected to the host computers 1 and 2.

The host computer 1 includes a count-key-data (to be abbreviated as CKD herebelow) interface 11 as an interface for the storage subsystem 3 and operates in accordance with the CKD format, and the host computer 1 is controlled by an operating system 12. Additionally, the system includes an application program 13 which operates under control of the operating system 12. Although there exist other inevitable constituent elements such as a central processing unit (CPU) in the computer, these elements are not particularly important in the description of the embodiment of the invention and hence will not be described in this application.

On the other hand, the host computer 2 includes a fixed length data interface 11 as an interface for the storage subsystem 3 and operates in accordance with the fixed length block format, and the host computer 2 is controlled by an operating system 22. Moreover, there exist an application program 23 and a format conversion program 24 which operate under control of the operating system.

The storage subsystem 3 includes a disk 31, a CKD interface 32 to be linked with the host computer 1, and a fixed length interface 33 to be connected to the host computer 2.

In the fixed length format, each data is stored in an area called "block". Each block is of a fixed length, e.g., 512 bytes and is assigned with a block number (to be abbreviated as LBA herebelow), the number being used for the accessing of the block.

On the other hand, in the CKD format, a record is accessed in accordance with specifications of a cylinder number (CC), a head number (HH), and a record number (R). A minimum access unit is one record. In the following description, a record address expressed by the cylinder, head, and record numbers is referred to as CCHHR and a track address represented by a cylinder number and a head number is called CCHH. In the CKD format, one record includes a count field (to be referred to as field C herebelow), a key field (to be referred to as field K), and a data field (to be referred to as field D herebelow). Field C includes CCHHR and lengths of fields K and D and is of a fixed length in any case. Each of fields K and D is of a variable length and has a length written in field C. One track includes a plurality of records. However, since the track has a fixed length, when the records have mutually different lengths, the number of records per track varies between the tracks. Information of the number of records and positions thereof in the track are not managed. Consequently, when a record at an intermediate point of the track is desired to be accessed, it is necessary to read the records beginning at the first position, i.e., to read the count field so as to obtain the position of the next record.

Additionally, one cylinder includes a plurality of tracks. The number of tracks per cylinder is fixed.

FIG. 2A shows data allocation in a track on a general CKD disk device and FIG. 2B shows a data format to store data in the CKD format in the storage subsystem of the embodiment of the invention. The disk 31 conforms to a fixed length data format, and data in the CKD format is converted into data in fixed length data format to be stored in the storage.

In FIG. 2A, HA 51 indicates a home address to represents, for example, a state of a track. ROC 52 is a count field of record 0 and ROD 53 denotes a data field of record 0 in which it is not allowed to store user data. RiC 54, R1K 55, and RID 56 are respectively a count field, a key field, and a data field of record 1. Between each fields, there exits a fixed-length area called "gap" in which data is not stored, namely, the gap is a demarcation to separate the fields from each other. Moreover, at an end of each of fields C, K, and D, there is additionally provided an error correction code (ECC) 60. The contents, ECC, and gap of field C are generated in the disk device.

Figure 2:
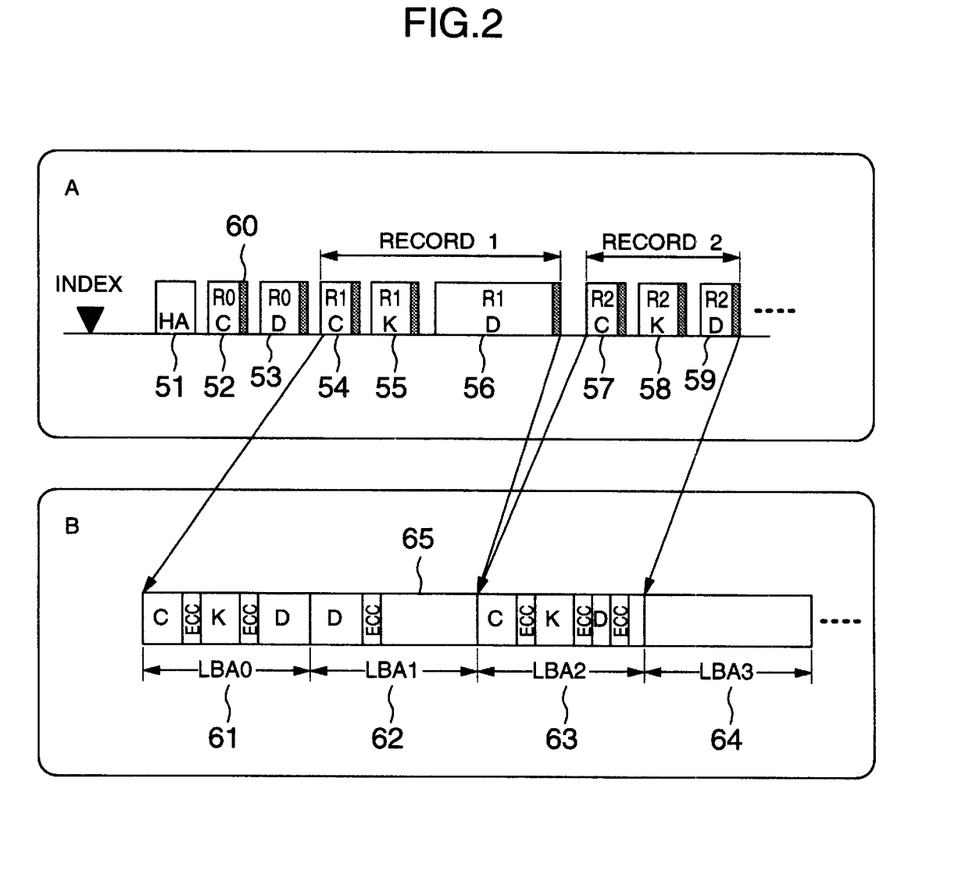
FIG. 2 is a diagram showing a layout of CKD format data stored in a storage subsystem.

In the storage subsystem, HA 51, R0C 52, and R0D 53 of each track are gathered to be stored in an area such that HA 51, R0C 52, and R0D 53 are invisible via the fixed length interface 33. When accessing LBA0 from the interface 33, the access is made to the first position as indicated by cylinder number 0, head number 0, and record number 1. When one record exceeds the size of one block as R1D of FIG. 2, data is consecutively written in the next block, i.e., LBA1 62. In the record, no gap exists between fields C, K, and D. Since the size of each record does not necessarily match the boundary of the fixed length block, an area from the end of record to the end of block is filled with blank 65, i.e., 0 is arranged therein for a gap. Record 2 then begins with the next block, LBA2 63. When the host computer 1 writes a record in the storage subsystem 3, the CKD interface 32 generates ECCs to be added to fields C and D at their end position and the blank 65 is added to form a fixed length block so as to write the record on the disk 31. Although the contents of the blank are not limited, 0 is used in this embodiment. In a reading operation, the CKD interface 32 reads a fixed length block, extracts fields K and D, and passes these fields to the host computer 1. Therefore, the host computer 1 is not required to consider the write format and the position of the record on the disk On the other hand, in an operation in which the host computer 2 read a record from the storage subsystem 3, for example, LBA0 of FIG.

2B, since the reading operation can be conducted only in the unit of one block, all of the contents of LBA0, i.e., the contents including field C and ECC are transferred to the host computer 2. In a data writing operation, data transferred from the host computer 2 is directly written in LBA0.

The track length is an integral multiple of the block length and hence each block includes an identical number of blocks. When the end of record in the track is other than the end of track, 0 is filled therein up to the end of track so that all tracks includes the same number of blocks. In addition, each cylinder includes an identical number of tracks.

Consequently, to access the first position of CCHHR=(C, H, 1), it is only necessary to calculate $$LBA = (C \times \text{no. of tracks per cylinder} + H) \times \text{no. of blocks per track} \quad (1)$$

Figure 3:
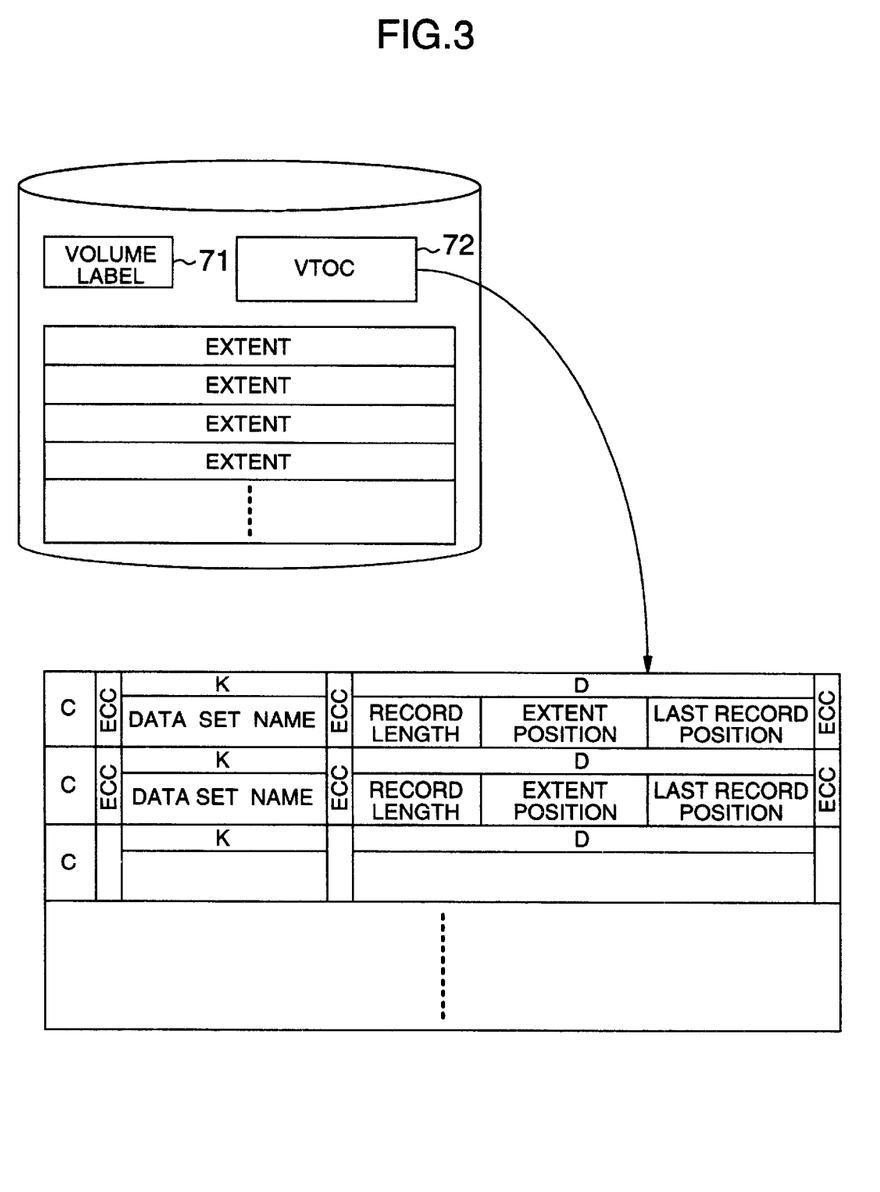
FIG. 3 is a diagram showing a data layout of data sets stored in a disk device.

FIG. 3 shows information and files (data sets) of a file system created on the disk 3 by the host computer 1. Disposed at a particular position of the disk 31 is a volume label 71 in which a write address of a volume table of contents (VTOC 72) is written in the form of CCHHR. In the VTOC 72, there is entirely recorded management information of data sets written on the disk 31, for example, a set of records each including a 44-byte key field and a 96-byte data field. The key field includes a data set name and the data field includes information such as positional information of the data set. As the positional information, there are written a record length, a position of an extent, and a position of a last record written in the extent. One set of these data items is referred to as DSCB.

A data set is located in an area called "extent". An extent is a consecutive area including a plurality of tracks. Depending on situations, one extent or two or more extents is or are arranged for a data set. When a plurality of extents are arranged, these extents need not exist in a continuous area.

When the application program 13 of the host computer 1 reads a data set, an access start position and a last record position are obtained from positional information of the pertinent data set in the VTOC 72 and determines CCHHR of a read position to thereby read the data set. These processing steps are carried out by the operating system 12. Moreover, although the data on the disk 31 includes information of filed C and ECC which are unnecessary for the host computer 1, the portion thereof is removed by the CKD interfaces 11 and 32. Namely, only the actual data of fields K and D are passed to the operating system 12 of the host computer 1 and the unnecessary information is not transferred thereto.

On the other hand, the operating system 22 of the host computer 2 knows neither the structure of the file system of the host computer 1 nor the configuration of CKD format data stored on the disk 31, it is impossible in this case to use the method of accessing a file system of the host computer 2. To overcome this difficulty, there is provided a format conversion program 24 such that the application program 23 of the host computer 2 accesses a data set of the host computer 1 via the program 24. The program 24 has a method similar to the method used by the storage subsystem 3 to write CKD format data on the disk 31 and to read CKD data from the disk 31. The program 24 includes a procedure to read data in a block unit from the storage subsystem 3 so as to obtain an actual data portion from the data in a format shown in FIG. 2B and a procedure in which the data passed from the application program 23 is regarded as a record to be converted into a CKD record such that the CKD record is further transformed into an FBA format record to be written on the disk 31. Additionally, the format conversion program has a procedure to interpret management information of a data set written in the VTOC 72 to obtain a position at which the data set is written. Next, referring to flowcharts, description will be given of a flow of a writing operation conducted by the conversion program 24 on a data set in three sections of open, write, and close processing.

Figure 4:
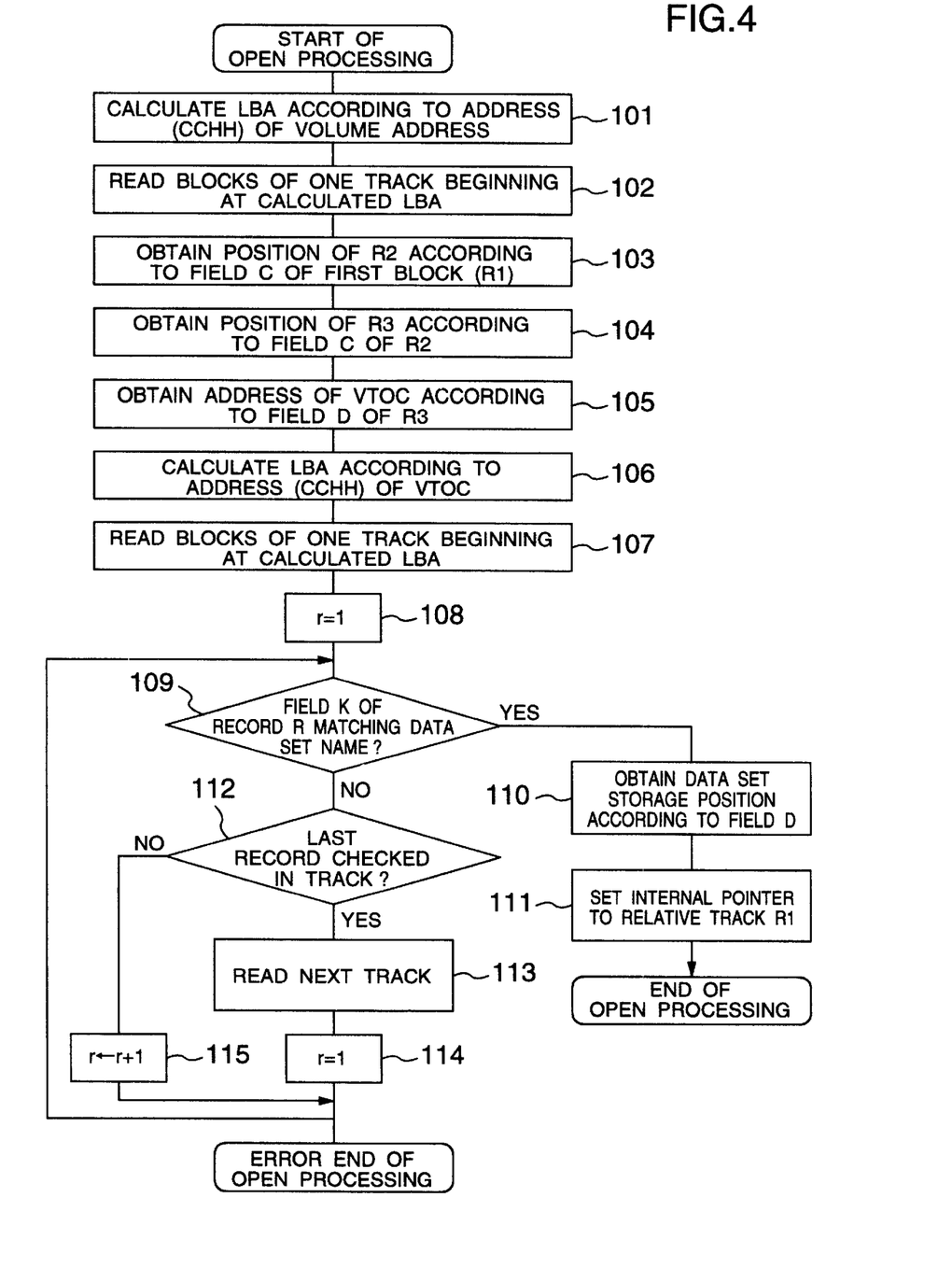
FIG. 4 is a flowchart showing an open processing of a data set.

FIG. 4 is a flowchart of processing in which the program 24 opens a data set.

The program 24 has a track buffer to keep one-track data therein, a block buffer to keep therein data of blocks corresponding to one DSCB, a set (called a record pointer) of a track number and a record number of a data set to be accessed, and a pointer (called a buffer pointer) indicating a position in the track buffer of the record number designated by the record pointer. In the open processing, a track including the volume label 71 is first read to check the position of VTOC. The label 71 exists at a fixed position in any cases, and the conversion program 24 beforehand knows the position presented by CCHHR on the disk 31 of the volume label 71. For example, assume that the volume label 71 exists at a position represented as cylinder number 0, head number 0, and record number 3. The program 24 calculates, in accordance with expression (1), LBA for cylinder no. 0 and head no. 0, namely, LBA no. 0 (step 101) and then reads blocks of one track beginning at the position and stores the blocks in the track buffer (step 102). Subsequently, by checking the field C of record 1 existing at a first position of the obtained block and then the length of field D, there is obtained a block position in which record 2 is stored (step 103). Thereafter, the operation above is again conducted, namely, the first field of record 2 is read to obtain the length of field D in accordance with field C to thereby check a block position of record 3 (step 104). As a result, field D of record 3 is known.

Next, a storage position of VTOC 72 is read from field D of record 3 (step 105) to calculate, according to expression (1), LBA corresponding to the position (step 106). Thereafter, blocks of one track are read beginning at the LBA to be moved to the track buffer (step 107). Subsequently, a retrieval is made through the track buffer to attain a data set name for the open processing. In a counter r prepared, an initial value of one is set to r (step 108). The key field of record r of the obtained track is checked to determine whether or not the key field matches with the name of the objective data set (step 109). When a pertinent record is detected, a storage position of the data set is obtained from field D to entirely store fields C, K, and D of the record in an internal buffer (step 110). When the record is missing, the value of r is incremented by one (step 115) and control is passed to step 109 to retrieve a subsequent record. In addition, if the record is missing even when the check is conducted up to the end of track of the pertinent track, a track subsequent thereto is read from the disk to conduct a retrieval beginning at record 1 (steps 113 and 114).

Figure 5:
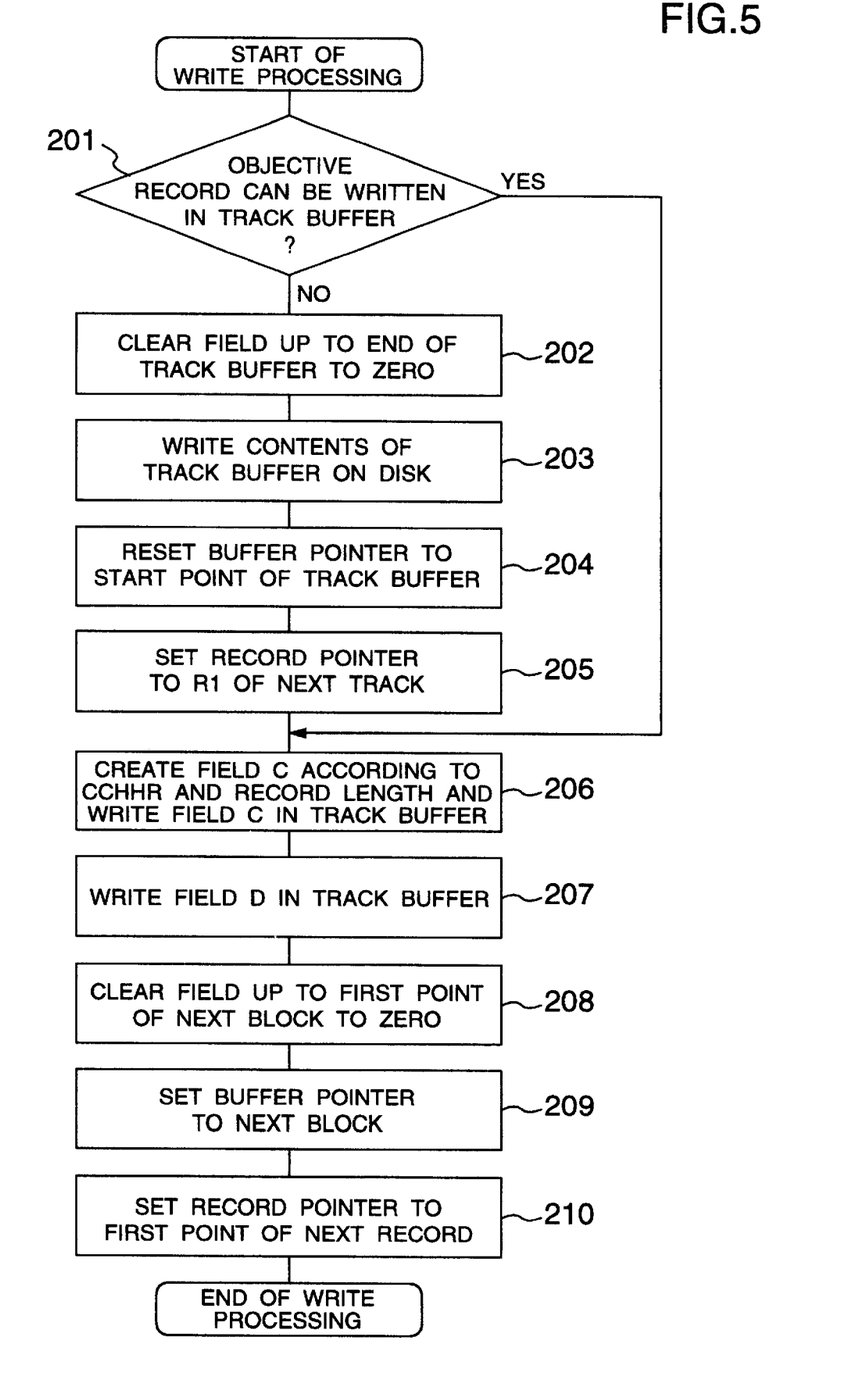
FIG. 5 is a flowchart showing a write processing of a data set.

Additionally, the write processing will be described by referring to FIG. 5. The format conversion program 24 receives a record length and contents of data from the application program 23 and then executes the write processing in a record unit. However, since the write operation on the disk 31 is carried out in a one-track unit which is an integral multiple of blocks. Therefore, if write requests were issued in the past, data received for the write requests are kept stored in the track buffer. In the write processing, a check is first made to determine whether or not the pertinent data received can be written in the track buffer (step 201). If the data cannot be written therein, the contents of the present track buffer ranging from the write position to the buffer end are cleared to zero (step 202), the track buffer is written in the storage subsystem 3 (step 203), the buffer pointer is reset to the first position of the track buffer (step 204), and then the record pointer is set to record 1 of the next track (step 205). The contents created in the track buffer are directly written on the disk 31.

In step 206 and subsequent steps, there is conducted processing to write CKD format data in the track buffer. First, information of field C is generated in accordance with the record pointer and the record length to be then written at a position of the track buffer indicated by the buffer pointer (step 206), and the received data is written therein after field C (step 207). The next record is to be written therein beginning at the first position of the next block. In consequence, when the block is not full of data, 0 is filled therein up to the first position of the next block (step 208). Finally, the buffer pointer is set to the first position of the next block (step 209) and then the record pointer is set to the next record (step 210).

Figure 6:
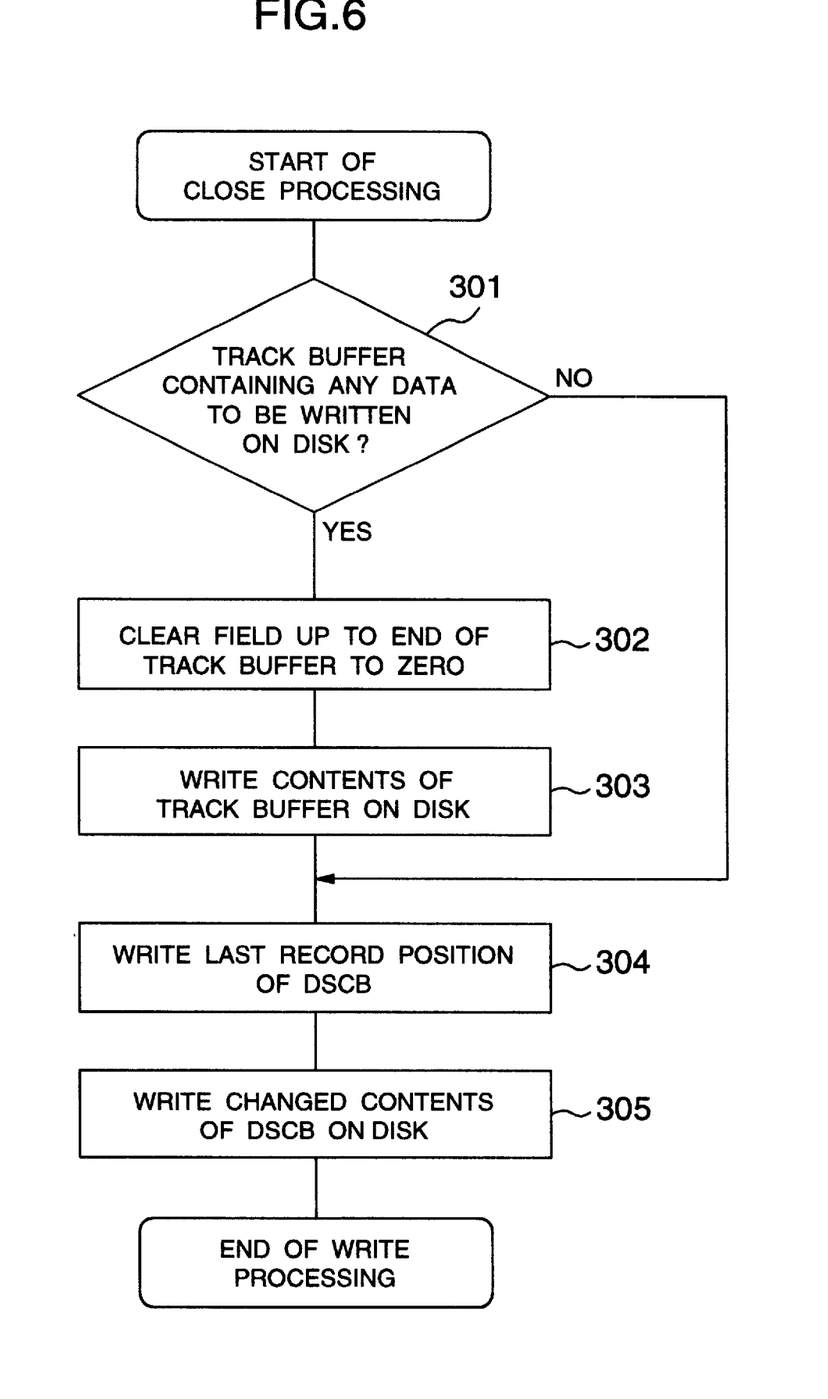
FIG. 6 is a flowchart showing a close processing of a data set.

Subsequently, the close processing of the format conversion program 24 will be described by referring to FIG. 6. First, a check is made to determine whether or not data has been written in the track buffer by the write processing conducted up to this point (step 301). If the data has been written therein, the contents of the buffer beginning at a position indicated by the current buffer pointer to the end of the track buffer are cleared to zero (step 302) and then the track buffer is written on the disk (step 303). Next, to rewrite the last record position in VTOC 72, information of the last record position is rewritten in the contents of the stored block buffer (step 304) and then the block buffer is written on the disk (step 305). With this operation, the close processing is completed.

In accordance with the computer system of the present invention, data can be shared between systems operating in accordance with storage procedures of mutually different data formats, namely, of the CKD and FBA formats. This advantageously enables a flexible data exchanging operation to be achieved with an increased performance.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A computer system, comprising:
   a computer with a first interface in accordance with fixed-length-data format; and
   a disk subsystem, storing count-key-data format data, and having a second interface in accordance with fixed-length-data format which is connected to the first interface of said computer,
   wherein said computer generates data, generates a count portion in accordance with said generated data, creates a record which includes said count portion and said data in accordance with the count-key-data format, adjusts said record into at least one fixed-length block, and sends said record as said at least one fixed-length block to said disk subsystem via said first interface, and
   wherein said disk subsystem stores said record.

2. A computer system according to claim 1, wherein said computer further includes a buffer which includes a plurality of blocks, each of said plurality of blocks is of a fixed length; and
   wherein said computer stores said record into said buffer so that said record begins at the first position of one of said plurality of blocks.

3. A computer system according to claim 1, wherein said count portion includes information designating a length of said data.

4. A computer system according to claim 3, wherein said disk subsystem further including a first channel interface connected to a second channel interface of another computer.

5. A computer, comprising:
   a central processing unit; and
   a first interface in accordance with FBA format which is connected to a second interface in accordance with FBA format of a disk subsystem which stores a count-key-data format data,
   wherein said central processing unit generates data, generates a count portion in accordance with said generated data, creates a record which includes said data and said count portion based on count-key-data format, adjusts said record into at least one fixed-length block, and sends said record as said at least one fixed-length block to said disk subsystem via said first interface.

6. A computer according to claim 5, wherein said count portion includes information designating a length of said data.

7. A computer according to claim 6, wherein said computer further includes a buffer which has a plurality of blocks, each of which has a fixed length, and wherein said computer stores said record into said buffer so that said record begins at a first position of one of said plurality of blocks, and sends said record stored in said buffer to said disk subsystem via said first interface per said buffer.

8. A method of controlling a computer system having computer and a disk subsystem, which stores a count-key-data format data, connected to said computer by a cable in accordance with FBA format, said method comprising the steps of:
   said computer accepting a write request to write data into said disk subsystem from an application program;
   said computer creating a count portion in accordance with said write data, creating a record which includes said count portion and said write data, and adjusting said record into at least one fixed-length block based on count-key-data format; and
   said computer sending said record as said at least one fixed-length block including said write data with said count portion to said disk subsystem via said cable.

9. A method of controlling a computer system according to claim 8, wherein said computer includes a buffer which includes a plurality of blocks each of which has a fixed length, and said method further including a step of:
   storing said write data with said count portion into said buffer so that said count portion begins at the first position of one of said plurality of blocks; and
   sending said write data with said count portion stored in said buffer to said disk subsystem via said first interface per said block.

10. A computer program embodied on computer-readable medium for controlling a computer connected to a disk subsystem by an interface in accordance with FBA format, comprising the steps of:
    receiving a write request to store data into said disk subsystem from an application;
    creating said data;

creating a count portion in accordance with said data, adding said count portion to said data, creating a record which includes said count portion and said data, and adjusting said record into at least one fixed-length block based on count-key-data format; and sending said record as said at least one fixed-length block including said data with said count portion to said disk subsystem via said interface.

11. A computer program according to claim 10, wherein said computer includes a buffer which includes a plurality of blocks each of which has a fixed length, and wherein said program further comprising the steps of:

storing said data with said count portion into said buffer so that said count portion begins at the first position of one of said plurality of blocks; and sending said data with said count portion stored in said buffer to said disk subsystem via said interface per said buffer.

* * * * *